United States Patent [19]

Shealy

[11] Patent Number: 5,950,211
[45] Date of Patent: Sep. 7, 1999

[54] DISCARDED HISTORY METHOD FOR SOLVING STREAMS MESSAGE BLOCK LEAKAGES

[75] Inventor: Spencer Shawn Shealy, Lexington, S.C.

[73] Assignee: NCR Corporation, Dayton, Ohio

[21] Appl. No.: 08/778,485

[22] Filed: Jan. 3, 1997

[51] Int. Cl.$^6$ ................................................... G06F 17/30
[52] U.S. Cl. .......................................... 707/204; 711/100
[58] Field of Search ....................... 707/1–10, 100–104, 707/200–206; 1/1; 711/100; 370/401; 379/45, 49; 395/500, 677, 683, 703, 710

[56] References Cited

U.S. PATENT DOCUMENTS

| | | | |
|---|---|---|---|
| 4,961,134 | 10/1990 | Crus et al. ................................. | 707/8 |
| 5,317,568 | 5/1994 | Bixby et al. .............................. | 370/401 |
| 5,430,871 | 7/1995 | Jamoussi et al. ........................ | 707/202 |
| 5,473,608 | 12/1995 | Gagne et al. ............................ | 370/401 |
| 5,491,808 | 2/1996 | Geist, Jr. .................................. | 711/100 |
| 5,717,919 | 2/1998 | Kodavalla et al. ....................... | 1/1 |

*Primary Examiner*—Ruay Lian Ho
*Attorney, Agent, or Firm*—Gates & Cooper

[57] ABSTRACT

A method, system, and program storage device for detecting object leakages in a computer system. Objects that are not properly deallocated by a computer system are detected by maintaining history logs for objects allocated during execution of a computer system and discarding those history logs associated with objects that are deallocated by the computer system. A wide variety of objects may be detecting, e.g., message blocks in a computer system streams subsystem.

36 Claims, 7 Drawing Sheets

DISCARDED HISTORY METHOD FOR SOLVING STREAMS MESSAGE BLOCK LEAKAGES

BACKGROUND OF THE INVENTION

1. Field of the Invention

The present invention relates generally to computer software diagnosis and debugging, and in particular, to object leakage diagnosis and debugging.

2. Description of Related Art

Computer program object leakages, that is, error conditions resulting from dynamically-allocated data or data structures that are never deallocated (e.g., freed or released), are particularly difficult to diagnose and correct. Much of the difficulty results from the nature of object leakages, since most object leakages are omission errors that occur due to the failure to do something needed (e.g., freeing or releasing an allocated object), rather than execution errors that occur due to executing incorrect code.

One specific type of object leakage is message block leakage, which occurs in computer systems which pass messages between subsystems, execution threads or other functional modules (hereinafter referred to as modules), and which results from message blocks being allocated but never deallocated. Message blocks are used, for example, in AT&T SVR4 based operating systems, such as the MP-RAS operating system, which employ streams subsystems to perform I/O related work. Functionality in the streams subsystem is divided into streams modules (and drivers), with the modules communicating with one another by passing message blocks therebetween.

Most debugging techniques are geared toward detecting execution errors, and thus, are unsuitable for debugging object leakages and other omission errors. For example, one standard debugging technique is to include specific code to catch errors. The use of specific code, however, is unsuitable for detecting omission errors, since there is often no scenario that can be detected and caught.

Another standard debugging technique is event logging, whereby specific events are recorded over time. However, for many omission errors which may be infrequent or intermittent in nature, event logging requires extensive space to maintain a log long enough to detect such errors. Particularly in large, multi-user, high availability computing environments, even infrequent/intermittent leakages can accumulate over time and cause system failures.

Another standard debugging technique is allocation tracking by origination, whereby object allocation events are recorded and assigned to the respective originating modules or execution threads. However, particularly in streams systems and the like, ownership of (and thus the responsibility for deallocating or freeing) message blocks may be transferred between modules. Consequently, simply knowing which module allocated a particular message block is not sufficient to permit adequate determination of the source of a message block leakage.

Therefore, a substantial need exists for a manner of detecting and diagnosing object leakages such as message block leakages and the like.

SUMMARY OF THE INVENTION

To overcome the limitations in the prior art described above, and to overcome other limitations that will become apparent upon reading and understanding the present specification, the present invention discloses a method, apparatus, and article of manufacture for detecting object leakages in a computer system. Objects that are not properly deallocated by a computer system are detected by maintaining history logs for objects allocated during execution of a computer system and discarding those history logs associated with objects that are deallocated by the computer system. A wide variety of objects may be detecting, e.g., message blocks in a computer system streams subsystem.

BRIEF DESCRIPTION OF THE DRAWINGS

Referring now to the Drawings in which like reference numbers represent corresponding parts throughout.

DETAILED DESCRIPTION OF THE PREFERRED EMBODIMENT

In the following description, reference is made to the accompanying Drawings which form a part hereof, and which is shown by way of illustrated embodiments of the invention. It is understood that other embodiments may be utilized and structural changes may be made without departing from the scope of the present invention.

Hardware Environment

Figure 1:
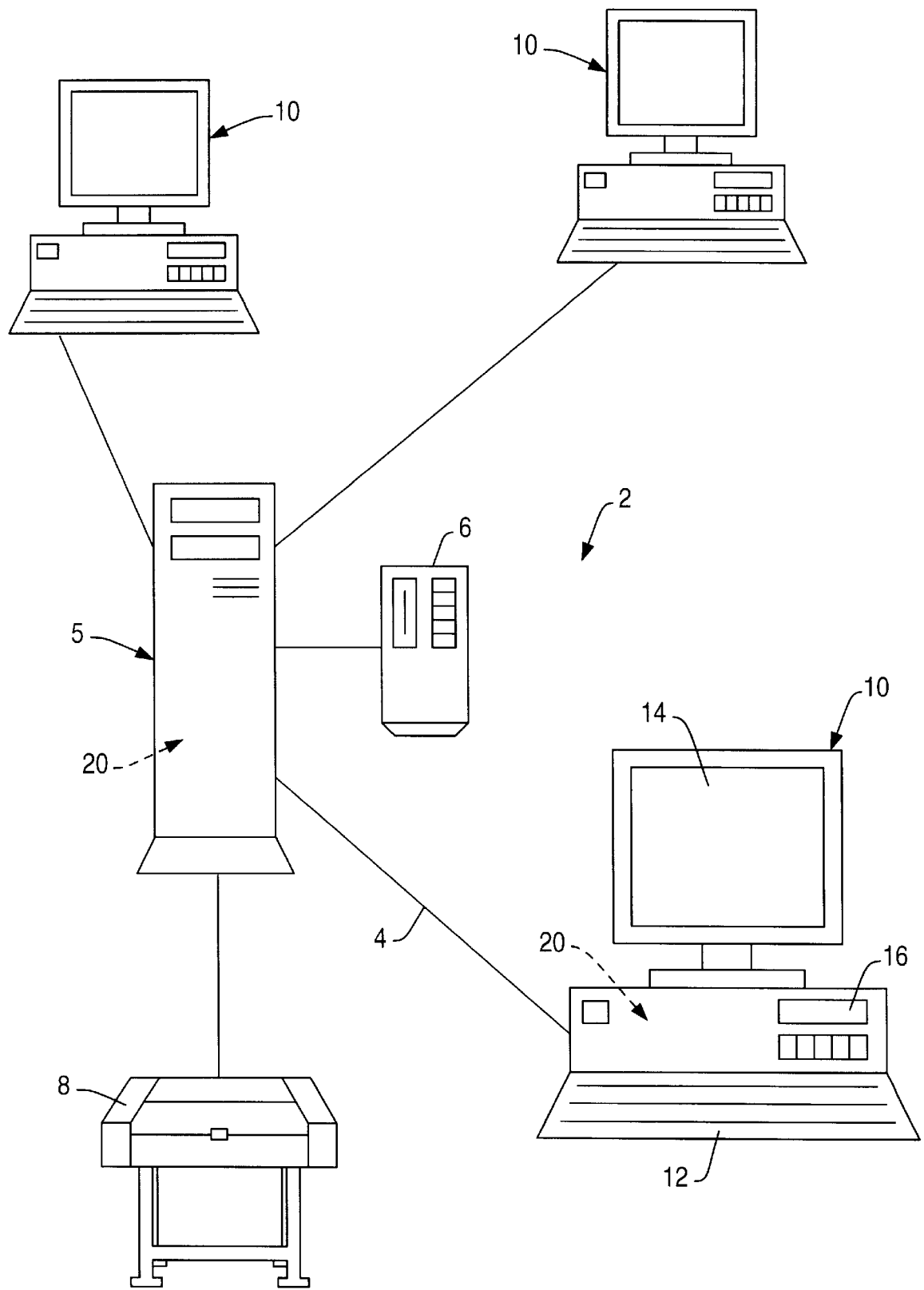
FIG. 1 is a block diagram illustrating an exemplary hardware environment used in a preferred object leakage detection method consistent with the invention.

FIG. 1 is an exemplary hardware environment embodiment used in conjunction with a preferred object leakage detection method consistent with the invention. The hardware environment is typically a networked computer system 2 which may include one or more servers such as server 5 coupled to one or more workstations 10 over a network 4. It is envisioned that attached to each workstation 10 may be a monitor 14 (e.g., a CRT, an LCD display or other display device); data storage devices 16, e.g., hard, floppy, and/or CD-ROM disk drives; and input devices, e.g., a keyboard 12. Additional components, e.g., network data storage devices 6 and network printers 8 may also be incorporated into computer system 2.

Generally, one or more computer programs 20 are utilized in the preferred embodiments of the invention, and are tangibly embodied in a computer-readable medium, e.g., one or more of the fixed and/or removable data storage data devices 6, 16. As shown in FIG. 1, under control of computer system 2, computer programs 20 may be loaded from the data storage devices into the memory of server 5 and/or workstation 10. The computer programs comprise instructions which, when read and executed by computer system 2, cause the computer system to perform the steps necessary to execute many of the computer-implemented steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Software Implementation

Preferred embodiments of the invention principally detect object leakages in a computer system by maintaining history logs (or event logs) for objects allocated in the computer system and discarding any history logs associated with deallocated objects. History logs may include any type of data structure which records historical information associated with an object over its lifetime.

In the embodiment described below, the objects being monitored are message blocks in the streams subsystem of an AT&T SVR4 based MP-RAS operating system. However, it should be appreciated that innumerable other types of objects, e.g., any of a number of dynamically-allocated and deallocated data structures, may be monitored by embodiments of the invention. For example, other message blocks, e.g., in distributed computer systems or multithreaded systems, may be monitored, as well as other memory structures. As another example, various file structures and file identification structures may be monitored such as the vnode, an operating system structure used to store file system type independent data related to an opened file. Therefore, while the illustrated embodiment will focus on addressing the problem of streams message block leakage, the invention should not be limited solely to this specific application.

Figure 2:
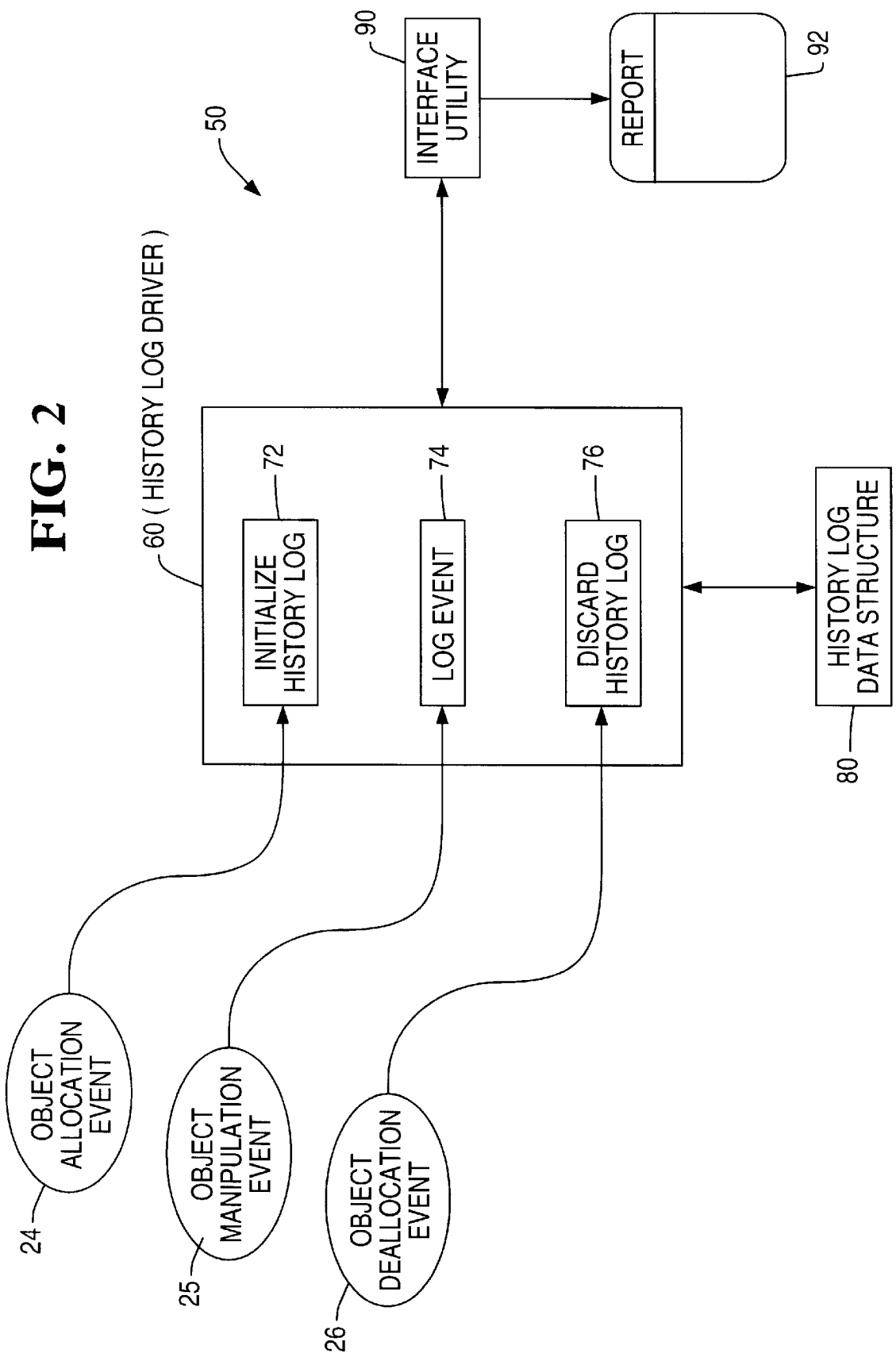
FIG. 2 is a block diagram illustrating an exemplary software implementation for a preferred object leakage detection method consistent with the invention.

A preferred software implementation for detecting message block leakages is illustrated in FIG. 2 as message block leak detector 50. Detector 50 is preferably implemented at the kernel level of a SVR4 based MP-RAS operating system resident in computer system 2 so that events which occur in modules throughout the streams subsystem may be effectively monitored and logged. However, it should be appreciated that detector 50 may be implemented at other hierarchical levels than the kernel in order to monitor and log other objects and events related thereto, and thus, invention should not be limited to the kernel implementation of detector 50 discussed herein.

Detector 50 generally includes a history log driver 60 which includes several routines 72, 74, 76 called by embedded probes; a history log data structure 80 and an interface utility 90. Driver 60 generally handles external access to the history logs stored in data structure 80. Utility 90 permits user interface with the driver, e.g., to obtain history log information in the form of a report 92.

As discussed in more detail below, routines 72, 74 and 76 in driver 60 handle data gathering, with function calls (probes) to the routines embedded in various kernel routines in computer system 2. An Initialize History Log routine 72 is typically called whenever a message block is allocated so that a history log for the message block can be initialized, e.g., as illustrated by an Object Allocation Event 24. A Log Event routine 74 is typically called to log an event in a message block's history log, e.g., due to manipulation of the object in some manner as shown by an Object Manipulation Event 25. A Discard History Log routine 76 is typically called whenever a message block is deallocated so that the history log can be discarded, e.g., as shown by an Object Deallocation Event 26.

History Log Data Structure

Figure 3A:
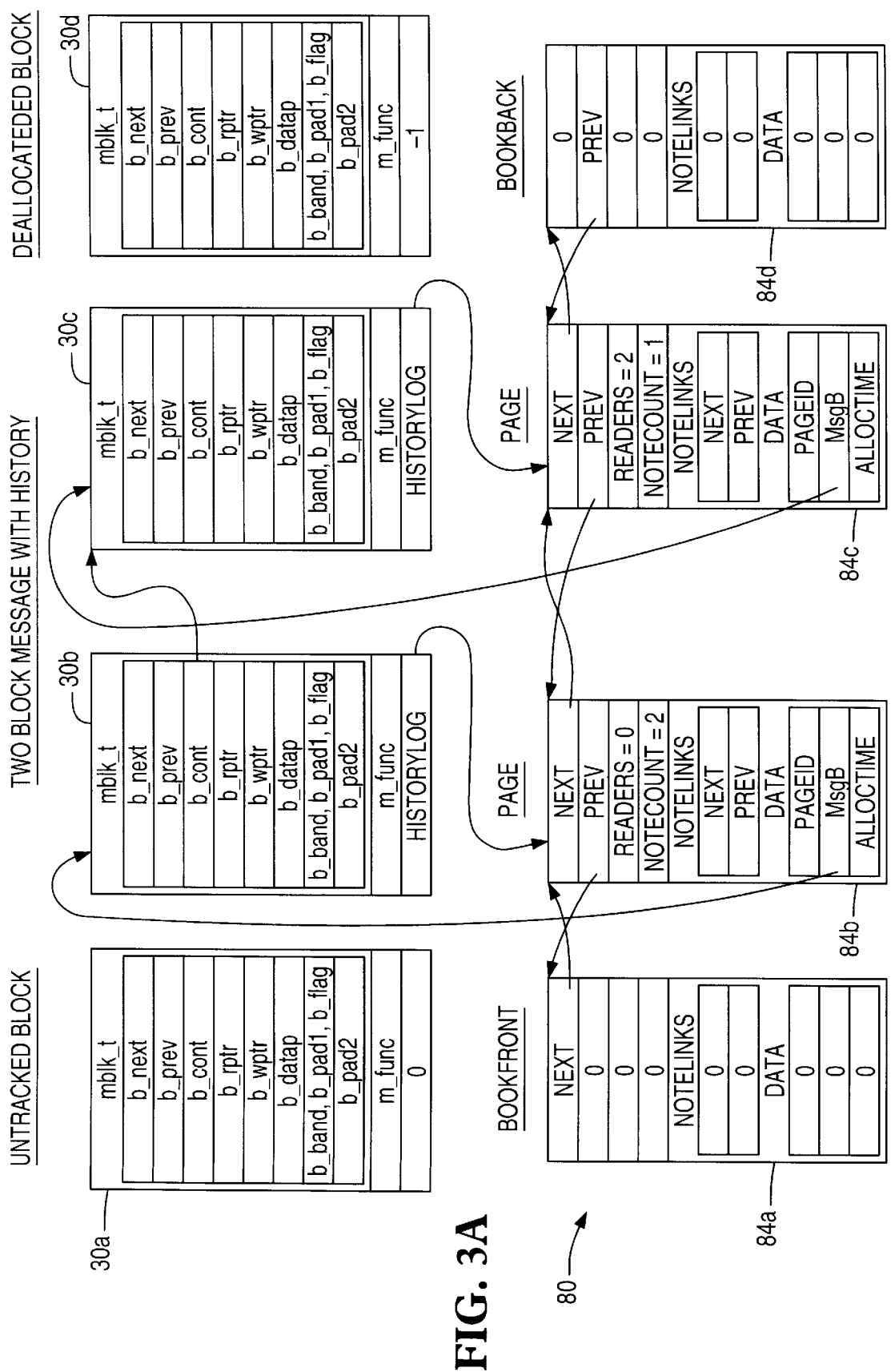
FIGS. 3(*a*) and 3(*b*) are block diagrams of an exemplary history log data structure for use in the software implementation of FIG. 2.
Figure 3B:
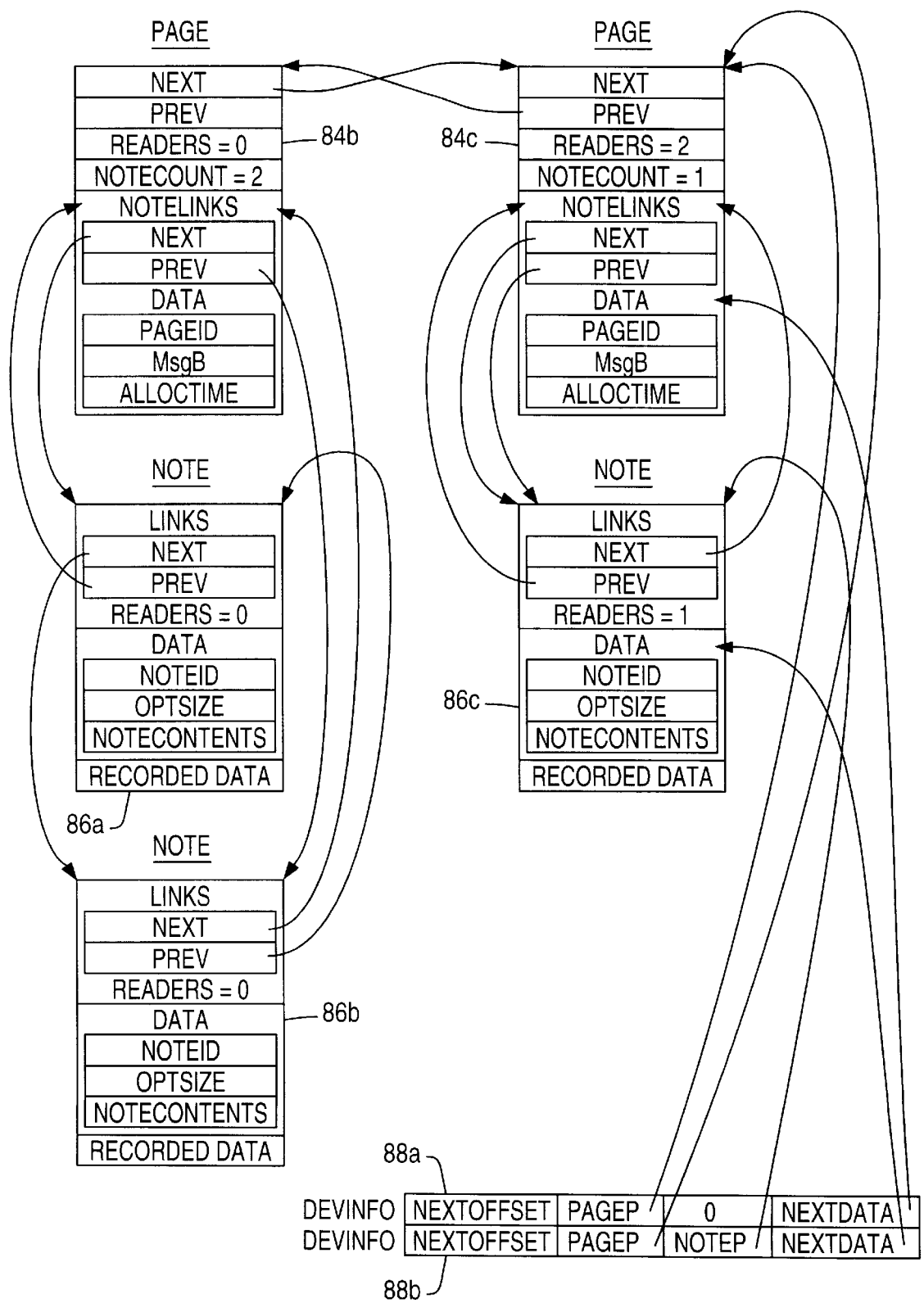

A preferred implementation of history log data structure 80 is illustrated in FIGS. 3(a) and 3(b). In this preferred implementation, the data structure may be analogized to a history book. A distinct page (history log) in the history book exists for every message block which is being monitored or tracked. Also, two blank end pages exist—one at the front of the book and one at the back of the book.

When a new message block is allocated (put into service), a page is added just before the back of the book. As the message block is used, notes are added to the end of the page for that message block to form a biography for the message block. Pages are limited in size, however, so if the page size is reached, then the oldest history note is discarded in order to make room for the new note as recent history is typically more interesting than ancient history. When the message block is deallocated (taken out of service), the page is torn out of the history book and discarded.

Every reader of the history book has a bookmark. The bookmark may be placed either between pages to point to the beginning of a page or may point within a page. If a bookmark points within a page and that page is discarded, then the bookmark is destroyed and the reader is unable to continue reading from the end of the previous reading. However, if a bookmark points between pages and the page following the bookmark is discarded, the bookmark is moved to the beginning of the page following the discarded page so the reader may continue. Thus, readers are encouraged to read multiples of whole pages at a time.

FIG. 3(a) shows several exemplary message blocks 30a, 30b, 30c and 30d which are generally stored in private mbinfo structures known only to the streams subsystem. All of the information stored in each message block, with the exception of the HistoryLog field which has been added at the end of each block, is unrelated to the creation and maintenance of the history log data structure (other than containing information that may need to be logged), and thus need not be discussed in greater detail herein.

The HistoryLog field typically can store one of several values. First, as exemplified by untracked message block 30a, this field may include 0 or another null value to indicate a message block which is not to be tracked or monitored by detector 50 (e.g., when the "–compose" parameter is set in the driver, as discussed below). Second, as exemplified by message blocks 30b and 30c (which together form a two block-long message), this field may point to the respective history log for the message block. Third, as exemplified by message block 30d (which has been deallocated), this field may include –1 or another unique tag to indicate that the history log for this block has been discarded.

History log data structure 80 is preferably implemented as a doubly linked list of Page structures (e.g., pages 84a, 84b, 84c and 84d). The two blank end pages are BookFront page 84a and BookBack page 84d and are statically allocated. All of the other Page structures are dynamically allocated and are inserted into the list prior to BookBack page 84dEach Page structure preferably includes the following items:

Next: the address of the next Page structure in the list (generally the history log for a message block which was allocated after the message block corresponding to this Page structure).

Prev: the address of the previous Page structure in the list (generally the history log for a message block which was allocated prior to the message block corresponding to this Page structure).

Readers: the number of DevInfo structures which reference this Page structure (discussed below).

NoteCount: the number of Note structures referenced by this Page structure.

NoteLinks: pointers to the first and last Note structures for this Page structure.

Data: a data structure within the Page structure that includes various items available for reading processes to read() through the driver's interface. These items may include:

PageID: a Page structure identifier which allows a reading process to distinguish whether it is receiving Page or Note structure information.

MsgB: the address of the message block corresponding to this page structure.

AllocTime: the system time when the associated message block was put into service.

As shown in FIG. 3(a), the Next and Prev fields of each Page structure 84a–84d point to the next and previous Page structures in the list (where a 0 designates an end of the list). In addition, Page structures 84b and 84c are respectively linked to message blocks 30b and 30c with the HistoryLog field in each message block pointing to the respective Page structure, and the MsgB field of the Page structure pointing back to the respective message block.

As shown in FIG. 3(b), notes are preferably implemented with a Note structure (e.g., Note structures 86a, 86b for Page structure 84b and Note structure 86c for Page structure 84c). The notes for a given page are linked together in a doubly linked list with the NoteLinks field of the Page structure at both ends of the list. Each Note structure preferably includes the following fields:

Links: pointers (Next and Prev) to the next and previous Note structures (generally the history for events which took place before or after the event which caused this Note structure to be recorded).

Readers: the number of DevInfo structures which reference this Note structure (discussed below).

Data: a data structure within the Note structure that includes various items available for reading processes to read() through the driver's interface. These items may include:

NoteID: a Note structure identifier which allows a reading process to distinguish whether it is receiving Page or Note structure information.

OptSize: the size of the optional portion appended to the end of this Note structure.

NoteContents: a set of flags which indicate which of the possible optional note items are appended to the end of this Note structure.

Additionally, the following items may be included in a Recorded data field following the Note structure:

The time when the note was recorded.

The system 1bolt value when the note was recorded.

The number of the cpu that recorded the note.

The address of the message block that caused this note to be recorded (i.e. the head message block of this message at that time).

The contents of the message block structure when this note was recorded.

The contents of the message block's data block structure when this note was recorded.

The data in the buffer of the message block when this note was recorded.

The contents of the relevant queue when this note was recorded.

The contents of the stack when this note was recorded.

The above items are necessarily specific to the analysis of message block leakages. Therefore, it should be appreciated that practically any state-related or other information that would assist in the diagnosis of object leakages may be stored in each note depending upon the particular application and type of tracked object involved. Accordingly, the invention should not be limited to the specific logged information discussed herein.

History log driver 60 (FIG. 2) preferably provides a clone device interface structure, with a new ID such as a minor number provided to an external process as a result of each successful open() of the driver. To this extent, pre-open information is preferably maintained in an array of DevInfo structures, or readers, indexed by minor number. A count of the number of entries in the array is preferably maintained, as well as a DevInfoP variable that stores the address of the first reader at the beginning of the array. The array is preferably dynamically allocated and resized by driver 50. As shown in FIG. 3(b), each DevInfo structure (e.g., structures 88a and 88b) preferably includes the following fields:

NextOffset: the file offset following the last successful read().

PageP: the address of the Page structure from which the next information is to be returned by a read(). If all of the data has already been returned, then it contains the address of the BookBack Page structure. This field preferably contains 0 if this DevInfo structure is not in use and −1 if the data being read was discarded since the last successful copy of data from the history book was made.

NoteP: the address of the Note structure from which the next information is to be returned by a read(), provided that the next read() will copy data from a Note structure. In all other cases, this field contains 0.

NextData: the address of the next byte of data from a Page or Note structure to be returned.

AuxBuf: the address of an auxiliary buffer used by the system call portion of the driver to carry out requests (not shown in FIG. 3(b)).

The driver may include an additional Parameters structure that is used to "tune" the driver operation. For example, the following tunables may be provided in a Parameters structure:

Info: specifies which optional items to include in new notes.

compose: specifies whether new allocations should be tracked.

BufferSize: indicates the maximum number of bytes from the buffer portion of a message block to be placed into a note.

StackDepth: indicates the maximum number of bytes from the stack to be placed into a note.

PageSize: indicates the maximum number of notes to be placed into a given page.

It should be appreciated that additional tunable options may be provided to customize the operation of detector 50.

Moreover, it should be appreciated that other data structures, whether or not implementing the "book", "page" or "note" analogies, may be used to implement the history log data structure consistent with the invention. For example, a single data structure of events (e.g., a linked list of notes) may be utilized, with each event associated with an object. Then, whenever an object is deallocated, or on a periodic basis, the entire data structure may be searched and purged of any events associated with deallocated objects. As another alternative, pointers to history logs may not be utilized within the objects being tracked, whereby a separate mechanism of locating the history logs would be required (e.g., a look-up table). Other data structures, including without limitation various arrays, trees, lists, tables, hashing algorithms, etc., may also be used to implement the history logs.

History Log Driver

History Log Driver 60 is preferably a loadable driver that includes a character interface for servicing requests to the driver device node. The driver is a clone driver, with a distinct minor number allocated when the device is opened by an open() system call thereto. Recorded data is preferably obtained from the device using a read() system call using the file descriptor, with the data stream returned by a sequence of read()s consisting of the Data Structure within the Page structure for each message block being tracked, with each followed by a sequence of Data Structures within the Note structures associated with the page.

The driver preferably supports the following input/output control (ioctl) commands:

GetParameters: Place the values of the current recording parameters into a Parameters structure.

SetParameters: Sets the values of the recording parameters to those specified in a Parameters structure. The contents of existing notes are not modified. However, if the value of the page size parameter (notes/page) is decreased, entire notes are removed in an oldest first order until no more than PageSize notes exist for any given message block.

GetCount: Retrieve the number of message blocks being tracked which were allocated within a specified number of seconds ago.

Clear: Discard all recorded history information.

Lbolt: Return the current system lbolt value (the time in HZ since the last boot).

LostInfo: Return the number of times that data could not be recorded (perhaps due to low memory).

Embedded Probes

Three routines, illustrated in FIG. 2, are provided in device driver 60 which are accessed via probes, or function calls, embedded at various points within the runtime program code of the operating system kernel of computer system 2.

A first routine is a history log initialization routine 72 which is called in response to an object allocation event 24 (in the case of the illustrated embodiment a message block allocation in the operating system kernel). Preferably, a probe or function call to this routine is embedded at a point in the program code in which an object is allocated or put into service, e.g., when the object is created or initialized, when memory for an object is allocated, or otherwise. For the aforementioned SVR4 based MP-RAS operating system, probes are preferably embedded in kernel routines (e.g., allocb() and dupb(), or any private subroutines called by these routines) such that allocation of a message block results in creation of a corresponding history log therefor. Other kernal routines which may require embedded probes include esballoc(), pullupmsg(), putctl(), putctll(), copyb(), copymsg(), msgpullup(), and dupmsg(), among others. However, it should be appreciated that the allocation of objects may vary for different types of objects, and so the invention should not be limited to the particular message block allocation event discussed herein.

Figure 4:
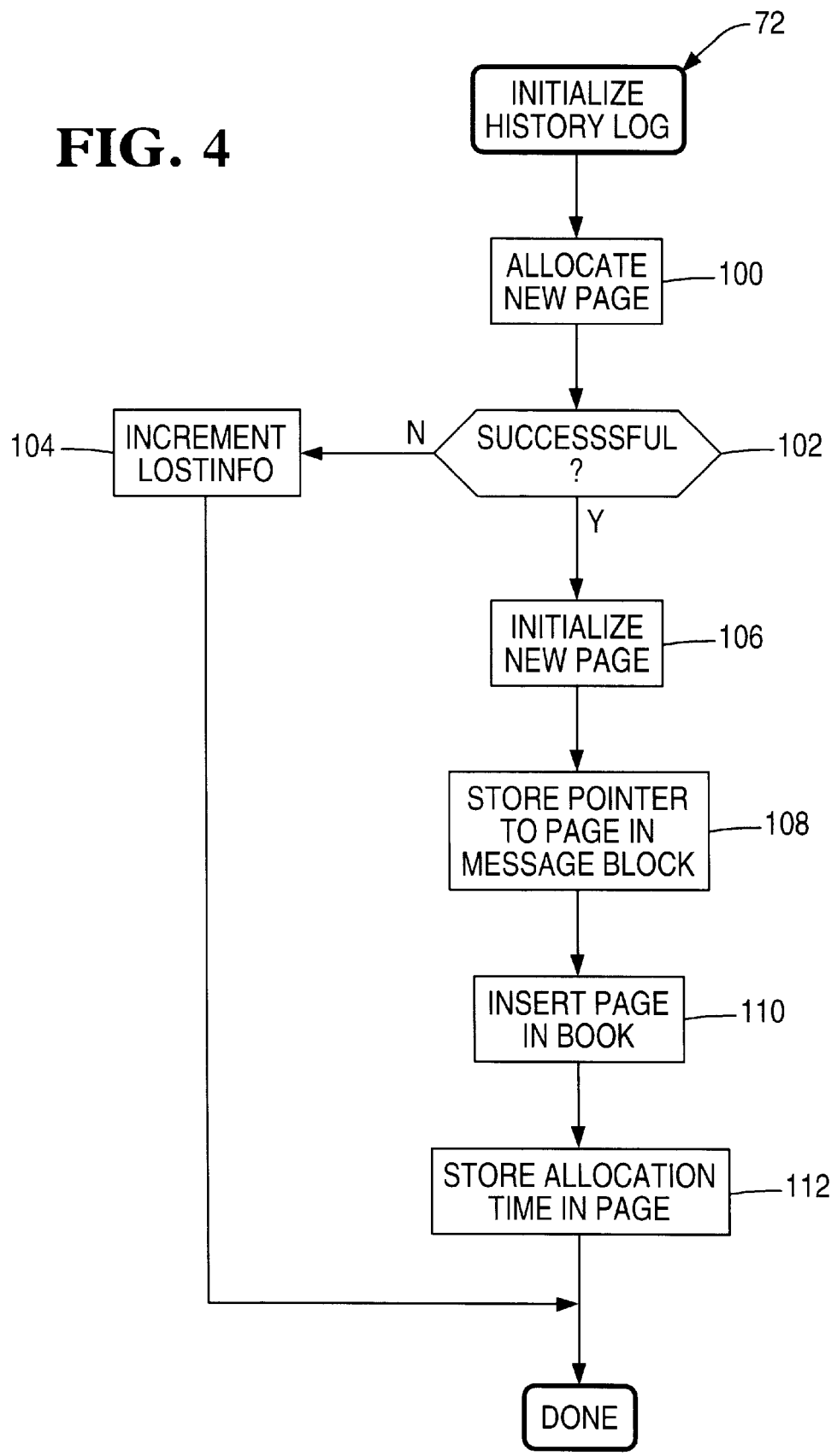
FIG. 4 is a flow chart illustrating the steps performed in the preferred history log initialization routine of FIG. 2.

Routine 72 is illustrated in greater detail in FIG. 4 by blocks 100–112. Routine 72 preferably is passed by the embedded probe a pointer to the message block being allocated.

In block 100, memory for a new page having the aforementioned Page structure is allocated. Next, block 102 checks whether the allocation was successful. If the allocation was not successful (e.g., in the event of low memory), control passes to block 104 to increment the LostInfo variable in device driver 60 and terminate the routine. Otherwise, control passes to block 106 to initialize the new page. In this block, the Readers and NoteCount fields are set to zero, the PageID field is initialized to indicate a page structure, the MsgB field is set to the message block pointer passed to the routine, and the NoteLink fields are initialized.

Next, in block 108, the pointer to the new page is stored in the HistoryLog field of the associated message block. Next, the new page is inserted into the book (linked list) immediately prior to the BookBack by updating the relevant Next and Previous fields of the new page, the BookBack page and the previous last page in the book. Next, in block 112 the current time is stored in the AllocTime field of the new page, whereby the routine is then complete.

Returning to FIG. 2, the next routine callable by embedded probes is a event logging routine 74 which is called in response to object manipulation events 25. Generally, probes are inserted in program code which handles events which are interesting (to the extent they are useful for debugging, for example) to an object during is lifetime. For example, in the streams subsystem of the SVR4 based MP-RAS operating system, a primary event which is of concern for message block leakage is whenever ownership of a message block is transferred between modules. Accordingly, in this application a probe call to routine 74 is preferably embedded in the putnext() routine to catch such ownership transfers.

Other events which may be logged to detect message block leakage may include size checking, block concatenation, and block duplication, copying and combining, among others. In addition, it may be useful to log an event upon allocation of a message block to obtain additional information over that which is stored in the Page structure at allocation. Events may also be logged for all message blocks in a message when the head message block is freebd()ed to catch any instances where only the head block is freed. Events are typically logged for both the existing and new message blocks created by copy or duplication operations. When a message block is linked to or unlinked from an existing message, events may be logged for every message block in the message, including the linked or unlinked message block. Events may also be logged for every message block in a message whenever a message block is removed from a message (e.g., with rmvb()), when a message is concatenated into a single message block (e.g., with pullupmsg() or msgpullup()), when bytes are trimmed from either end of a message (e.g., with adjmsg()), or when the number of data bytes in a message is queried (e.g., with msgdsize()). Moreover, events may be logged when a message is pulled from or put onto a service queue, when the number of messages in a queue are counted, with a queue is flushed, when messages in a given priority band are flushed from a queue, etc. Other operations may also require event logging, and thus it should be appreciated that the above-mentioned operations are not exhaustive.

The types of events which may be useful to log for other types of objects are innumerable and may vary widely for different applications. For example, other useful events may include various streams module defined events, among others.

Figure 5:
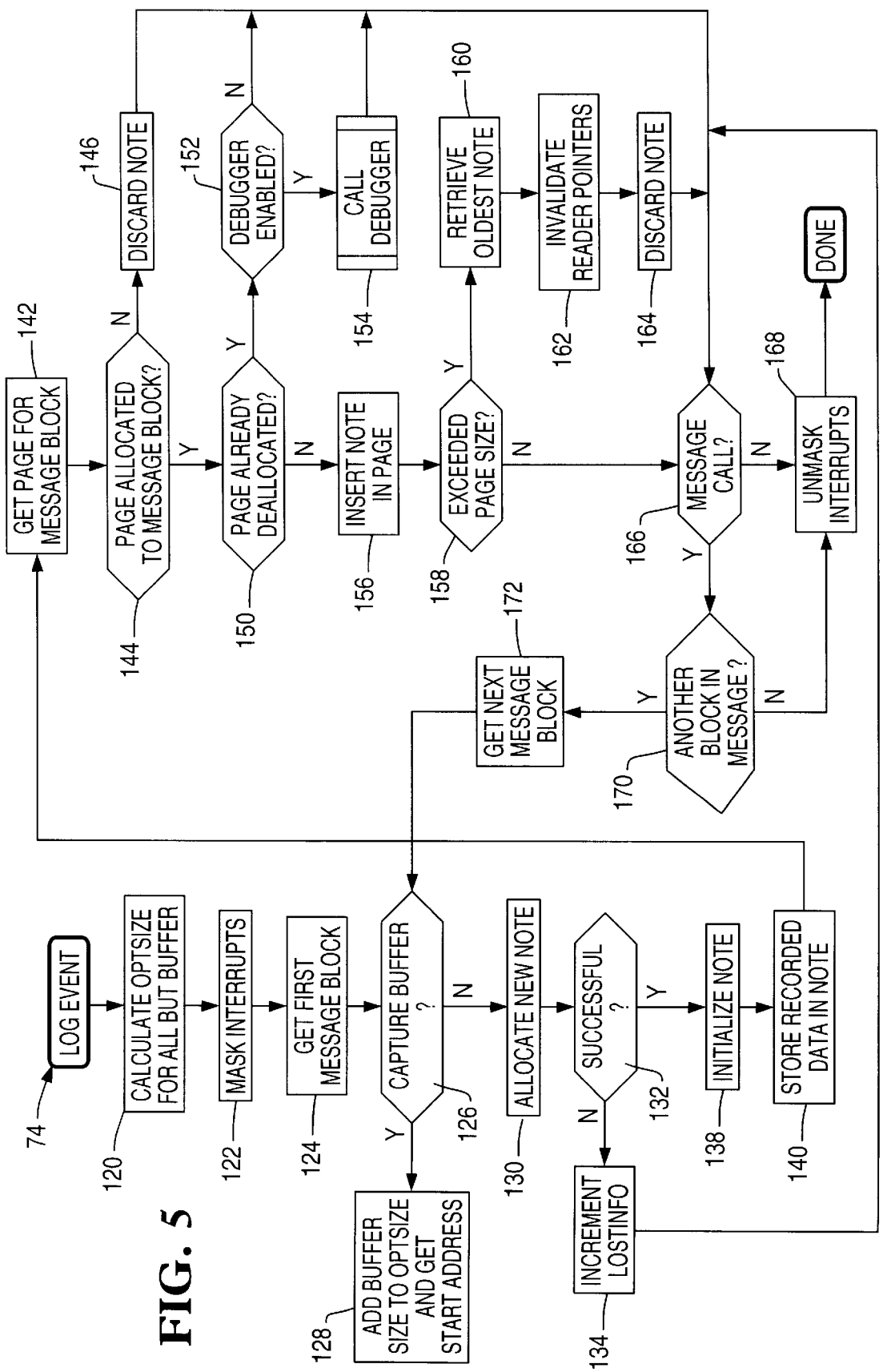
FIG. 5 is a flow chart illustrating the steps performed in the preferred event logging routine of FIG. 2.

Routine 74 is illustrated in greater detail by blocks 120–168 of FIG. 5. Routine 74 is preferably passed by an embedded probe a pointer to a message block, a pointer to the message queue (if desired, otherwise zero), and a flag indicating whether the call to the routine is for logging only the referenced message block, or for logging the entire message to which the referenced message block heads.

Routine 74 begins in block 120 by partially calculating the OptSize variable to be stored in the new note, based upon the particular data to be recorded as indicated by the data stored in the Parameters structure for the driver, with the exception of the Buffer data (which may vary between blocks in a message). The optional data may include time, 1bolt, cpu, message block address, message block data, queue data, and stack data (the size of which may be limited in the Parameters structure), for example.

Next, in block 122, the message is locked out by masking interrupts to prevent modification thereto during the execution of routine 74. Next, the first message block (that pointed to in the routine call) is retrieved in block 124. If the Parameters structure in the driver indicates in block 126 that the buffer is to be captured, control passes to block 128 to add the buffer size (which can be no more than the limit stored in the Parameters structure) to OptSize and to calculate a starting address in the buffer from which data should be copied in a note.

Next, in block 130 a new Note structure is allocated, after which block 132 checks whether the allocation was successful. If not (e.g., due to low memory), control passes to block 134 to increment the LostInfo variable, then onto block 166 to process additional message blocks (if any). Otherwise, control passes to block 138 to initialize the note, principally by setting the Readers field to zero, storing the calculated OptSize variable in the note, initializing the NoteID field to indicate a note structure, and storing a copy of the current Info field from the Parameters structure (indicating what data is recorded in the note) in the NoteContents field. Next, in block 140 the data specified in the Parameters structure (and indicated in the NoteContents field) is appended to the Note structure as recorded data.

Next, in block 142 the Page structure corresponding to the retrieved message block is obtained. Next, if block 144 detects that the page is not allocated to the message block (indicating the message block is not being tracked), control passes to blocks 146 and 148 to discard the note (free up its memory). Control is passed to block 166, where the message/block flag passed to the routine is checked to determine whether only one message block or an entire message of message blocks is being processed. If only one message block is being processed, control passes to block 168 to unmask interrupts and terminate the routine. Otherwise, control passes to block 170 to determine if another message block remains to be processed in the message. If not, control passes to block 168 to unmask interrupts and terminate the routine. Otherwise, control passes to block 172 to retrieve the next message block in the message, and then to block 126 to record a note for the next message block.

Returning to block 144, if the page obtained in block 142 is allocated to the message block, control passes to block 150 to determine if the page has already been discarded or deallocated (typically by checking if the HistoryLog field in the message block is "−1" or another suitable indicator). If so, the message block appears to have been used after it has been deallocated, indicating an often serious use-after-free error. In this instance, control may be diverted to block 152 to determine whether the kernel debugger has been enabled (e.g., with the "+kdb" parameter, discussed below). In addition, a warning message may be logged and output to an operator. If the debugger is enabled, it is immediately called in block 154 to assist in diagnosis of the problem. After debugging, or if the debugger is not enabled, control is passed to block 166 to process additional message blocks as necessary.

Returning to block 150, if the page obtained in block 142 has not yet been deallocated, control passes to block 156 to insert the new note into the page, typically by inserting the note as the last note in the linked list pointed to by the NoteLinks in the associated page. In addition, the NoteCount field in the page is incremented. Next, in block 158, if the NoteCount for the page exceeds the maximum notes/page specified in the Parameters structure for the driver, control diverts to blocks 160–164 to remove the oldest note in the page. In block 160, the address of the oldest note in the page is retrieved. Next, in block 162, the device reader pointers are invalidated, typically by searching through the NoteP fields of the DevInfo entries for pointers to the oldest note and invalidating (setting to null) any such pointers. Next, in block 164 the note is discarded by updating the linked list of notes to skip the oldest note and thereafter deallocating the memory for the note.

After the oldest note is discarded, or if the page size has not been exceeded, control passes to block 166 to process additional message blocks as appropriate. If only one message block is to be processed, or if the last message block in a message is processed, the interrupts are unmasked and the routine is complete.

Returning to FIG. 2, a third routine callable by embedded probes is a history log discard routine 76 which is called in response to an object deallocation event 26. As discussed above, whenever an object is deallocated, no leakage is present with regard to that particular object, and thus the associated history log for the object may be discarded. In the case of the illustrated embodiment, the object deallocation is the deallocation or removing from service of a message block by a module in the streams subsystem. Preferably, a probe or function call to this routine is embedded at a point in the program code in which memory for an object is released. On the other hand, the memory for a deallocated object need not necessarily be immediately released (e.g., if a cache of deallocated message blocks is maintained to satisfy future allocb() requests), and thus actual freeing up of memory is not a prerequisite for discarding an associated history log.

For the aforementioned SVR4 based MP-RAS operating system, probes are preferably embedded in freeb() or related kernel routines (or in private subroutines called by these routines) such that deallocation of any message block results in the corresponding history log being discarded. However, it should be appreciated that the deallocation of objects may vary for different types of objects, and so the invention should not be limited to the particular message block deallocation event discussed herein.

Figure 6:
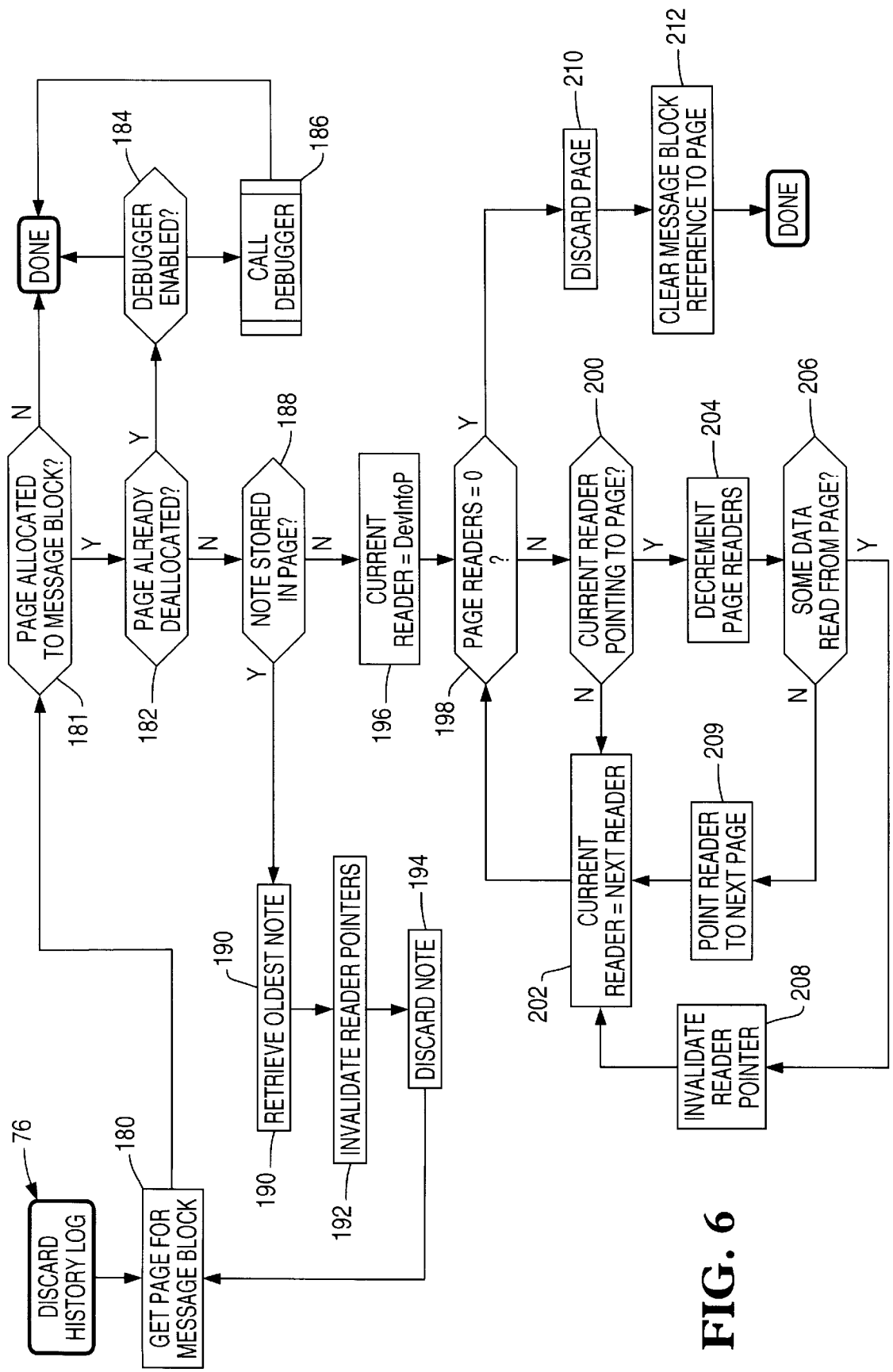
FIG. 6 is a flow chart illustrating the steps performed in the preferred history log discard routine of FIG. 2.

Routine 76 is illustrated in greater detail in FIG. 6 by blocks 180–212. Routine 76 preferably is passed by the embedded probe a pointer to the message block being deallocated. Similar to blocks 142–144 and 150–154 of routine 74, blocks 180–186 of routine 76 retrieve the page associated with the referenced message block and determine (1) whether the referenced message block has a page allocated to it, and (2) whether the referenced message block has already been taken out of service. If either instance is true, the routine is prematurely terminated. Moreover, if the latter instance is true and the debugger is enabled, the debugger is called in block 186 to assist in diagnosis of the double-free error indicated by block 182. Moreover, a warning related to the double-free error may be logged and output to the operator.

Next, in blocks 188–194 all of the notes are removed from the retrieved page. Block 188 determined whether any notes remain on the page. If so, control passes to blocks 190–194 which, similar to blocks 160–164 of routine 74, retrieve the oldest note in the page, invalidate all reader pointers to the note, and discard the note and thereby deallocate its memory.

Control cycles back to block 180 to remove the remainder of the notes until block 188 determines no more notes are on the page.

Next, in blocks 196–209, the file pointer references to the page are removed from each of the DevInfo structures (readers). In block 196, a variable Current Reader is set to DevInfoP, the pointer to the first reader. Next, in block 198, the Readers field in the Page structure for the page is checked to determine if any readers are currently pointing to the page (typically not a common occurrence). If there are, control passes to block 200 to determine whether the PageP field of the current reader points to the page. If not, control passes to block 202 to set the Current Reader to the next DevInfo structure, and then return to block 198 to check the next reader. If the PageP field does point to the page, however, control passes to block 204 to decrement the Readers field of the page, then to block 206 to determine if some data has been returned (read) from the page (which is typically indicated by a reader pointer that doesn't point to the beginning of the Data structure for the page). If some data has been read, the file pointer is invalidated in block 208. Otherwise, the file pointer may simply be modified in block 209 to point to the next page in the book. Regardless of the outcome, however, control returns to block 202 to process additional readers.

After all of the file pointers to the page have been handled (i.e., when the Readers field of the page=0), block 198 passes control to block 210 to discard the page, typically by unlinking the page from the book (modifying the linked list pointers to skip the page) and deallocating the memory for the page. Next, in block 212 the HistoryLog field in the message block is cleared and set to indicate that the history log has been discarded (typically with a "−1" value or other identifier). Routine 76 is then complete.

Interface Utility

As discussed above, an interface utility 90 is preferably utilized to conFIG. the device driver and to process collected information. A number of arguments may be supplied to the utility to control the device driver accordingly. Each argument to the utility implies an operation, and the operations are performed in the order that the arguments are given on the command line. If no arguments are given, the utility outputs the values of the current capture parameters on the standard output and exits. The format of this output is the same as the arguments to this utility.

The following arguments are preferably supported:

report: Read recorded history from the device, format the information, and output it in a report format.

+compose: Enable tracking of newly allocated message blocks.

−compose: Disable tracking of newly allocated message blocks. Message blocks which are currently being tracked are still tracked.

clear: Clear all of the collected information.

count <secs>:

Output a count of the message blocks which are currently being tracked which were allocated at least <secs> seconds ago.

buffer <bytes>:

Limit the size of the data copied from the buffer portion of the message block into each note to a maximum of <bytes> bytes.

stack <bytes>:

Limit the size of the data copied from the kernel stack into each note to a maximum of <bytes> bytes.

page <notes/mblk>:

Limit the number of notes in the history kept for each message block to <notes/mblk>. Trim all existing message block histories to a maximum of <notes/mblk> notes by removing the oldest notes.

Each time a new note is added to this history for a given message block which already contains <notes/mblk> notes, the oldest note is discarded.

+time: Enable the capture of a copy of the system time into new notes.

−time: Disable the capture of a copy of the system time into new notes.

+1bolt: Enable the capture of a copy of the system 1bolt (which contains the time in HZ since the system was booted) into new notes.

−1bolt: Disable the capture of a copy of the system 1bolt (which contains the time in HZ since the system was booted) into new notes.

+CPU: Enable the capture of a copy of the number of the processor making a note into new notes.

−CPU: Disable the capture of a copy of the number of the processor making a note into new notes.

+msg: Enable the capture of a copy of the message block address passed to the streams routine which caused a note to be recorded into new notes. This address is not necessarily the same as the address of the message block itself because messages can contain multiple message blocks.

−msg: Disable the capture of a copy of the message block address passed to the streams routine which caused a note to be recorded into new notes.

+msgb: Enable the capture of a copy of the msgb portion of the message block into new notes.

−msgb: Disable the capture of a copy of the msgb portion of the message block into new notes.

+datab: Enable the capture of a copy of the datab portion of the message block into new notes.

−datab: Disable the capture of a copy of the datab portion of the message block into new notes.

+buffer: Enable the capture of a copy of the buffer portion of the message block into new notes.

−buffer: Disable the capture of a copy of the buffer portion of the message block into new notes.

+queue: Enable the capture of a copy of the relevant queue structure (for message block operations involving queue structures) into new notes.

−queue: Disable the capture of a copy of the relevant queue structure into new notes.

+stack: Enable the capture of a copy of the stack into new notes.

−stack: Disable the capture of a copy of the stack into new notes.

+kdb: Enable debugger. If the kernel debugger is installed, then upon detection of a message block use-after-free problem, enter the kernel debugger so that the problem may be diagnosed.

−kdb: Disable debugger.

In addition, the utility preferably generates a report having the following information:

The system time when the report operation was initiated.

The length of time between when the system was booted and when the report operation was initiated.

The number of failed attempts to record entries in the tracking data since the device driver was loaded.

The history log information, listed progressing from the information for the oldest message block to the most recently allocated message block.

For each message block, the following information from its associated Page structure is preferably output:

The address of the message block (MsgB).

The system time when the message block was allocated (AllocTime).

The contents of the recorded notes, listed in order starting with the oldest note for the message block and progressing to the most recent note for the message block.

For each note, the following items from the associated Note structure may be included:

The system time when the note was recorded.

The length of time between when the note was recorded and when the report operation was initiated.

The number of the system processor (CPU) that recorded the note.

The message block address that was passed to the device driver which caused the note to be recorded, generally, either the address of the associated message block or the address of the head message block related thereto.

The contents of the msgb, datab, and buffer portions of the message block when the note was recorded.

The contents of the relevant queue structure when the note was recorded.

The contents of the kernel stack when the note was recorded.

Usage

In order to detect message block leakages, the following steps are typically performed. First, the interface utility is preferably called to set the capture parameters to obtain the desired level of detail to be placed into the notes, if other than default detail is desired. The default recording parameter values set by the device driver are: −compose, buffer 48, stack 208, page 5, +time, +1bolt, +CPU, +msg, +msgb, +datab, +buffer, +queue, +stack and +kdb.

Second, tracking of new allocations is enabled by calling the utility with the +compose argument. At this point, tracking of message block events (history logging) is initiated.

Once logging is initiated, an operator periodically monitors the history log information for old outstanding allocations. This may be performed by periodically requesting a report from the interface utility. Alternatively, monitoring may be performed simply by requesting that the interface utility display the number of message blocks allocated over a period of time (e.g., within the last 24 hours) that have not yet been deallocated, e.g., by calling the utility with the argument count and a <secs>argument set to 86400.

If it is believed that leakage has occurred, the history log information may be captured and output by calling the utility using the argument report.

Some streams modules and drivers may allocate message blocks the first time that they are used and intentionally never free these message blocks. Therefore, if it is desired to exclude these initial allocations from the history data, an operator may exercise these modules and drivers (by using the system interfaces supported by these streams modules and drivers) prior to enabling tracking. In addition, in order to distinguish between the case where a module has completely forgotten about a message block versus having it allocated for an extremely long time, an operator may need to stop system services (for example, by entering single-user mode) prior to capturing the data.

Analysis of the history log information is performed using standard debugging and diagnosis techniques. It has been found that many problems may be diagnosed by analyzing the last module responsible for a leaked message block.

As an example of a typical diagnosis technique for the aforementioned streams subsystem, currently allocated message blocks may be studied starting with the oldest first. For each message block, the time when the most recent note was recorded may be examined. If the time is recent and changes between reports, then the message block may be getting reused repeatedly by a particular module. However, if the time when the most recent note was recorded for a given message block is long ago, then that message block may have been forgotten. By observing the stack portion of the note, often the reason why the message block has neither received further activity nor been deallocated may be discovered.

The most recently applied DDI/DKI streams kernel utility function (the last function applied) may be determined by knowing that a return address within that function is typically located in the second long value printed in the stack. If the last function applied is _put(), then the message block was being passed to a module's put procedure when the note was recorded. The q_qinfo field in the queue structure indicates which queue's put procedure was invoked. The source code for that module's put procedure may be analyzed in view of the state information present in the note to determine why nothing further was done with the message block.

Somewhere below the return address within the last function applied exists a return address within the function in the module which called the last function applied. Usually, this address is located at the address 4 greater than the long value just before the last function applied return address. Accurate determination of the calling function may be confirmed by disassembling the instruction preceding the one located at the return value and verifying that the instruction is a call to the last function applied. The source code for this module may be analyzed in view of the state information present in the note to determine why nothing further was done with the message block.

To shut down the history logging, the utility is preferably called with the −compose argument followed by the clear argument to disable tracking of new allocations and then clear existing history information.

All of the information recorded into notes consume kernel memory until the corresponding message block is deallocated, and accordingly, if the intent of using the device driver is simply to detect the existence of a leak, but not to diagnose the problem, then the page size (notes/mblk) may be set to 0 so that no notes will be kept in the history of newly allocated message blocks. A leakage can then be detected, but no information other than the address of the leaked message block and the time that it was allocated would be available for problem diagnosis.

In addition, it has been found that the most recent note for a message block in many cases contains all of the needed information to solve the leakage problem. Therefore, if usage of kernel memory is a concern, the page size (notes/mblk) may be set to 1.

Conclusion

This concludes the description of the preferred embodiment of the invention. The following describes some alternative embodiments for accomplishing the invention.

For example, any type of computer system, incorporating without limitation any combination of mainframes, minicomputers, workstations, network computers, personal computers (desktop or portable), etc., could be used with the present invention.

In summary, the present invention discloses a method, system, and program storage device for detecting object leakages by maintaining history logs for allocated objects and discarding history logs for any deallocated objects.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of detecting object leakages in a computer system, the method comprising the steps of:
   (a) maintaining history logs of events for objects allocated in the computer system; and
   (b) when objects are deallocated by the computer system, discarding the history logs associated with the deallocated objects while maintaining the history logs associated with objects that are still allocated.

2. The method of claim 1, wherein the maintaining step includes the steps of:
   initializing a history log for an object when the object is allocated in the computer system; and
   logging events to the history log in response to selected operations performed on the object.

3. The method of claim 2, wherein the initializing step includes the step of linking the history log to the object.

4. The method of claim 2, wherein the logging step includes recording state information associated with the object in the history log.

5. The method of claim 4, wherein the object is a message block, and wherein the state information is selected from the group consisting of stack data, queue data, time, 1bolt, cpu, message block data, message block address, message block header, message block buffer data, and combinations thereof.

6. The method of claim 5, wherein the computer system includes a streams subsystem through which the message block is processed, and wherein the initializing, logging and discarding steps are executed in response to function calls embedded in an operating system kernel of the computer system.

7. The method of claim 5, wherein the logging step includes the step of selectively logging events to the history logs for each message block in a message.

8. The method of claim 2, wherein the history log comprises a page data structure coupled to page data structures for additional history logs in a linked list to form a book data structure.

9. The method of claim 8, wherein the book data structure includes front and back pages coupled at opposing ends of the linked list, and wherein the initializing step comprises the steps of dynamically allocating the page data structure for the history log and inserting the page data structure into the linked list immediately prior to the back page of the book data structure.

10. The method of claim 8, wherein the logging step includes the step of storing a note in a linked list for the page data structure for the object.

11. The method of claim 10, wherein the discarding step includes the steps of deallocating the page data structure and any notes linked thereto for a deallocated object, and removing the page data structure from the linked list in the book data structure.

12. The method of claim 2, further comprising the step of outputting information from the history logs of objects that have not yet been deallocated.

13. A computer system, comprising:
   (a) a computer;
   (a) means, performed by the computer, for maintaining history logs of events for objects allocated in the computer system; and
   (b) means, performed by the computer, for, when objects are deallocated by the computer system, discarding the history logs associated with the deallocated objects while maintaining the history logs associated with objects that are still allocated.

14. The computer system of claim 13, wherein the means for maintaining history logs further comprises:
   means for initializing a history log for an object when the object is allocated in the computer system; and
   means for logging events to the history log in response to selected operations performed on the object.

15. The computer system of claim 14, wherein the means for initializing a history log includes means for linking the history log to the object.

16. The computer system of claim 14, wherein the means for logging includes means for recording state information associated with the object in the history log.

17. The computer system of claim 16, wherein the object is a message block, and wherein the state information is selected from the group consisting of stack data, queue data, time, 1bolt, cpu, message block data, message block address, message block header, message block buffer data, and combinations thereof.

18. The computer system of claim 17, wherein the computer system includes a streams subsystem through which the message block is processed, and wherein the means for initializing, logging and discarding operate in response to function calls embedded in an operating system kernel of the computer system.

19. The computer system of claim 17, wherein the means for logging includes means for selectively logging events to the history logs for each message block in a message.

20. The computer system of claim 14, wherein the history log comprises a page data structure coupled to page data structures for additional history logs in a linked list to form a book data structure.

21. The computer system of claim 20, wherein the book data structure includes front and back pages coupled at opposing ends of the linked list, and wherein the means for initializing comprises means for dynamically allocating the page data structure for the history log and means for inserting the page data structure into the linked list immediately prior to the back page of the book data structure.

22. The computer system of claim 20, wherein the means for logging includes means for storing a note in a linked list for the page data structure for the object.

23. The computer system of claim 22, wherein the means for discarding includes means for deallocating the page data structure and any notes linked thereto for a deallocated object, and means for removing the page data structure from the linked list in the book data structure.

24. The computer system of claim 14, further comprising means for outputting information from the history logs of objects that have not yet been deallocated.

25. An article of manufacture comprising a program storage device, readable by a computer system and tangibly embodying one or more programs of instructions executable by the computer system to perform method steps of detecting object leakages, the method comprising the steps of:
   (a) maintaining history logs of events for objects allocated in the computer system; and (b) when objects are deallocated by the computer system, discarding the history logs associated with the deallocated objects while maintaining the history logs associated with objects that are still allocated.

26. The article of manufacture of claim 25, wherein the maintaining step includes the steps of:

initializing a history log for an object when the object is allocated in the computer system; and logging events to the history log in response to selected operations performed on the object.

27. The article of manufacture of claim 26, wherein the initializing step includes the step of linking the history log to the object.

28. The article of manufacture of claim 26, wherein the logging step includes recording state information associated with the object in the history log.

29. The article of manufacture of claim 28, wherein the object is a message block, and wherein the state information is selected from the group consisting of stack data, queue data, time, 1bolt, cpu, message block data, message block address, message block header, message block buffer data, and combinations thereof.

30. The article of manufacture of claim 29, wherein the computer system includes a streams subsystem through which the message block is processed, and wherein the initializing, logging and discarding steps are executed in response to function calls embedded in an operating system kernel of the computer system.

31. The article of manufacture of claim 29, wherein the logging step includes the step of selectively logging events to the history logs for each message block in a message.

32. The article of manufacture of claim 26, wherein the history log comprises a page data structure coupled to page data structures for additional history logs in a linked list to form a book data structure.

33. The article of manufacture of claim 32, wherein the book data structure includes front and back pages coupled at opposing ends of the linked list, and wherein the initializing step comprises the steps of dynamically allocating the page data structure for the history log and inserting the page data structure into the linked list immediately prior to the back page of the book data structure.

34. The article of manufacture of claim 32, wherein the logging step includes the step of storing a note in a linked list for the page data structure for the object.

35. The article of manufacture of claim 34, wherein the discarding step includes the steps of deallocating the page data structure and any notes linked thereto for a deallocated object, and removing the page data structure from the linked list in the book data structure.

36. The method of claim 26, further comprising the step of outputting information from the history logs of objects that have not yet been deallocated.

* * * * *